US009624347B2

(12) United States Patent
Sakai et al.

(10) Patent No.: US 9,624,347 B2
(45) Date of Patent: Apr. 18, 2017

(54) RESIN COMPOSITION AND FILM FORMED FROM SAID RESIN COMPOSITION

(71) Applicant: THE NIPPON SYNTHETIC CHEMICAL INDUSTRY CO., LTD., Osaka (JP)

(72) Inventors: Norihito Sakai, Osaka (JP); Kaoru Inoue, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/650,990

(22) PCT Filed: Dec. 11, 2013

(86) PCT No.: PCT/JP2013/083246
§ 371 (c)(1),
(2) Date: Jun. 10, 2015

(87) PCT Pub. No.: WO2014/092131
PCT Pub. Date: Jun. 19, 2014

(65) Prior Publication Data
US 2015/0307674 A1 Oct. 29, 2015

(30) Foreign Application Priority Data
Dec. 14, 2012 (JP) ................................ 2012-273530

(51) Int. Cl.
*C08L 29/04* (2006.01)
*C08L 77/00* (2006.01)
*C08J 5/18* (2006.01)
*C08L 77/02* (2006.01)
*C08L 77/06* (2006.01)

(52) U.S. Cl.
CPC .............. *C08J 5/18* (2013.01); *C08L 77/02* (2013.01); *C08L 77/06* (2013.01); *C08J 2329/04* (2013.01); *C08J 2377/02* (2013.01); *C08J 2377/06* (2013.01); *C08J 2429/04* (2013.01)

(58) Field of Classification Search
CPC ........ C08L 77/06; C08L 77/102; C08L 77/02; C08L 77/00; C08L 29/04; C08J 5/18; C08J 2329/14; C08J 2377/06
See application file for complete search history.

(56) References Cited

U.S. PATENT DOCUMENTS

| 7,361,392 B2 | 4/2008 | Borodaev et al. |
| 2004/0062889 A1 | 4/2004 | Borodaev et al. |
| 2006/0051466 A1 | 3/2006 | Delius et al. |
| 2009/0316264 A1* | 12/2009 | Kitamura .................. C08J 5/18 359/489.2 |
| 2010/0055482 A1 | 3/2010 | Furukawa et al. |
| 2010/0315710 A1* | 12/2010 | Sugino .................... B29C 55/14 359/485.01 |
| 2013/0131270 A1 | 5/2013 | Shibutani et al. |

FOREIGN PATENT DOCUMENTS

| JP | 2004359965 A | * 12/2004 | |
| JP | 2006-124669 A | 5/2006 | |
| JP | WO 2012014981 A1 | * 2/2012 | .............. C08L 29/04 |
| JP | 2012-46744 A | 3/2012 | |

OTHER PUBLICATIONS

Machine Translation of JP 2004359965.*
International Search report issued with respect to application No. PCT/JP2013/083246, mail date is Mar. 18, 2014.
International Preliminary Report on patentability issued with respect to application No. PCT/JP2013/083246, mail date is Jun. 16, 2015.

* cited by examiner

*Primary Examiner* — Mark Kaucher
(74) *Attorney, Agent, or Firm* — Greenblum & Bernstein, P.L.C.

(57) ABSTRACT

The present invention provides the resin composition having excellent inflation moldability by which a film having high water vapor transmission rate (WVTR) and low elastic modulus can be produced, and a film which is formed from the resin composition. The present invention relates to a resin composition comprising a polyamide resin (A) and a polyvinyl alcohol-based resin (B) which includes 2-10% by mole of structural unit represented by the following general formula (1) and has a degree of saponification of 70-90% by mole, and a film which is formed from the resin composition.

[Chem. 1]

$$\begin{array}{c} R^1 \ R^3 \\ | \ \ | \\ -(C-C)- \ \ R^4 \ R^5 \\ | \ \ | \ \ \ \ \ \ | \ \ | \\ R^2 \ X\text{---}C\text{---}C\text{---}R^6 \\ \ \ \ \ \ \ \ \ | \ \ | \\ \ \ \ \ \ \ OH \ OH \end{array} \quad (1)$$

[In the formula, $R^1$ to $R^6$ each independently represent a hydrogen atom or an organic group, and X represents a single bond or a linking chain.]

6 Claims, No Drawings

RESIN COMPOSITION AND FILM FORMED FROM SAID RESIN COMPOSITION

TECHNICAL FIELD

The present invention relates to a resin composition suitable for use in producing films for packaging contents such as foods, and to a film formed from the resin composition.

BACKGROUND ART

Polyamide resins are excellent in terms of tensile strength and impact strength, and are in extensive use as a material for packaging films for foods or the like. For example, a film of a resin composition comprising a polyamide resin containing a hydrophilic compound incorporated thereinto has been proposed as a film having water vapor permeability which is for packaging water-containing foods and thereafter heating and drying the packaged foods to diminish or remove the water contained therein (see, for example, Patent Document 1).

However, films formed from the resin composition disclosed in Patent Document 1 have a practically insufficient water vapor transmission rate (hereinafter referred to as WVTR), and there is a possibility that drying of the packaged contents might require a prolonged time period, resulting in a deterioration of the contents.

Meanwhile, such films are required to have a low elastic modulus, and resin compositions to be used for producing such films are required to be capable of being stably molded by inflation molding, i.e., to have excellent inflation moldability.

PRIOR-ART DOCUMENT

Patent Document

Patent Document 1: U.S. Pat. No. 7,361,392

SUMMARY OF THE INVENTION

Problems to be Solved by the Invention

An object of the invention, which has been achieved in view of the circumstances described above, is to provide a resin composition from which a film having a high water vapor transmission rate (WVTR) and a low elastic modulus can be produced and which has excellent inflation moldability, and to provide a film formed from the resin composition.

Means for Solving the Problems

As a result of extensive studies in consideration of the above circumstances, the present inventors have found that a film having high water vapor transmission rate (WVTR) and low elastic modulus can be produced by combining a polyamide resin and a specific polyvinyl alcohol resin, and that a resin composition having excellent inflation moldability can be obtained.

That is, the present invention has the features of the following [1] to [7].

[1] A resin composition comprising a polyamide resin (A) and a polyvinyl alcohol based-resin (B) which includes 2-10% by mole of structural unit represented by the following general formula (1) and has a degree of saponification of 70-90% by mole.

[Chem. 1]

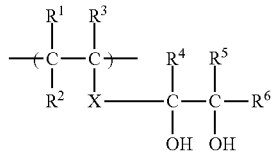

[In the formula, $R^1$, $R^2$, and $R^3$ each independently represent a hydrogen atom or an organic group, X represents a single bond or a linking chain, and $R^4$, $R^5$, and $R^6$ each independently represent a hydrogen atom or an organic group.]

[2] The resin composition described in [1] above, wherein the content of the structural unit represented by the general formula (1) in the polyvinyl alcohol-based resin (B) is 4-8% by mole.

[3] The resin composition described in [1] or [2] above, wherein the structural unit represented by the general formula (1) is the structural unit represented by the following general formula (1').

[Chem. 2]

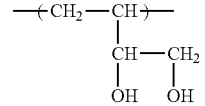

[4] The resin composition described in any one of [1] to [3] above, wherein a content ratio (A/B) of the polyamide resin (A) to the polyvinyl alcohol-based resin (B) is from 90/10 to 51/49 by weight.

[5] The resin composition described in any one of [1] to [4] above, wherein the polyamide resin (A) has a melting point of 150-240° C.

[6] The resin composition described in any one of [1] to [5] above, which gives a film that has a water vapor transmission rate of 900-1,500 g/m²·24 hr·30 μm.

[7] A film which is formed from the resin composition described in any one of [1] to [6] above.

The resin composition of the invention has excellent inflation moldability, and the film formed from the resin composition of the invention has the advantage of being high in water vapor transmission rate (WVTR) and low in elastic modulus. These effects of the invention are presumed to be due to the hydroxy groups, in particular, the primary hydroxy group, in the structural unit represented by the general formula (1), which improve the affinity of the resin (B) for the polyamide resin (A) and thereby improve compatibility between the two resins (A) and (B) and improve melt tension.

Effects of the Invention

The resin composition of the invention has excellent inflation moldability and can be used to produce films having a high water vapor transmission rate (WVTR) and a low elastic modulus.

EMBODIMENTS FOR CARRYING OUT THE INVENTION

The invention is described below in detail.

The resin composition of the invention includes a polyamide resin (A) and a polyvinyl alcohol (PVA)-based resin (B). The polyamide resin (A) to be used in the invention is explained first.

[Polyamide Resin (A)]

Examples of the polyamide resin (A) to be used in the invention include:

polymers formed by the ring-opening polymerization of lactams, such as polycaprolactam (nylon-6), polyheptolactam (nylon-7), polycapryllactam (nylon-8), polynonanolactam (nylon-9), polyundecanolactam (nylon-11), and polylauryllactam (nylon-12);

copolymers formed by the ring-opening copolymerization of lactams, such as caprolactam/lauryllactam copolymers (nyloy-6/12) and caprolactam/nonanolactam copolymers (nylon-6/9);

polycondensates of diamine with dicarboxylic acid, such as polyethylenediamineadipamide (nylon-26), polytetramethyleneadipamide (nylon-46), polyhexamethyleneadipamide (nylon-66), polyhexamethylenesebacamide (nylon-610), polyhexamethylenedodecamide (nylon-612), polyoctamethyleneadipamide (nylon-86), polydecamethyleneadipamide (nylon-106), polydecamethylenesebacamide (nylon-108), and ethylenediamine adipamide/hexamethylene adipamide copolymers (nylon-26/66); and lactam/diamine/dicarboxylic acid copolymers such as caprolactam/hexamethylene adipamide copolymers (nylon-6/66), lauryllactam/hexamethylene adipamide copolymers (nylon-12/66), caprolactam/hexamethylene adipamide/hexamethylenediammonium sebacate copolymers (nylon-66/610), and ethyleneammonium adipate/hexamethylene adipamide/hexamethylenediammonium sebacate copolymers (nylon-6/66/610).

It is especially preferred to use nylon-6/66, from the standpoint that this resin has excellent compatibility with the PVA-based resin (B) to be used in the invention and has a low melting point.

The melting point of the polyamide resin (A) to be used in the invention is preferably 150-240° C., especially 170-230° C., in particular 170-210° C., more preferably 180-190° C. In case where the melting point thereof is too high, a high temperature is necessary for melt-mixing this resin with the PVA-based resin (B) and this melt mixing tends to thermally deteriorate the PVA-based resin (B). Conversely, too low melting points thereof tend to result in an increased difference in melt viscosity between this polyamide resin and the PVA-based resin (B) when the two resins are melt-mixed, rendering even melt mixing difficult.

The viscosity (Pa·s) of the polyimide resin (A) to be used in the invention, as measured at a shear rate of 120 sec$^{-1}$ and at 220° C., is preferably 200-3,000, especially 1,000-2,000, in particular 1,200-1,500. In case where the viscosity thereof is too high, heat generation by shearing is prone to occur and this tends to result in a decrease in thermal stability during molding. Conversely, too low viscosities thereof tend to result in an insufficient melt tension, making it impossible to stably obtain bubbles when bubbles are to be formed in inflation molding.

[PVA-Based Resin (B)]

The PVA-based resin (B) to be used in the invention is a resin having a structural unit represented by the following general formula (1). In the general formula (1), $R^1$, $R^2$, and $R^3$ each independently represent a hydrogen atom or an organic group, X represents a single bond or a linking chain, and $R^4$, $R^5$, and $R^6$ each independently represent a hydrogen atom or an organic group.

[Chem. 3]

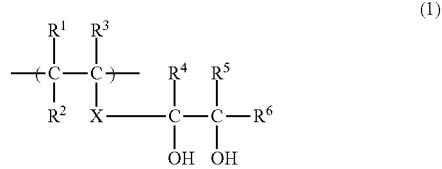

(1)

It is especially preferable that in the structural unit represented by the general formula (1), $R^1$ to $R^3$ and $R^4$ to $R^6$ are all hydrogen atoms and X is a single bond. The PVA-based resin (B) which has the structural unit represented by the following general formula (1') is suitable for use.

[Chem. 4]

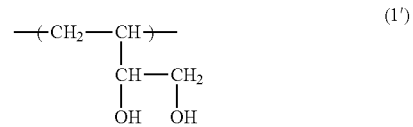

(1')

$R^1$ to $R^3$ and $R^4$ to $R^6$ in the structural unit represented by the general formula (1) may be organic groups so long as the amount thereof is not so large and the resin properties are not considerably impaired. Examples of the organic groups include alkyl groups having 1-4 carbon atoms, such as methyl, ethyl, n-propyl, isopropyl, n-butyl, isobutyl, and tert-butyl. These organic groups may have functional groups such as a halogeno, hydroxy, ester group, carboxy group, and sulfo group.

It is preferable, from the standpoints of thermal stability and stability under high-temperature or acidic conditions, that the structural unit represented by the general formula (1) is one in which X is a single bond. However, X may be a linking chain so long as this resin does not lessen the effects of the invention. Examples of the linking chain include hydrocarbons such as alkylenes, alkenylenes, alkynylenes, phenylene, and naphthylene (these hydrocarbons may have been substituted with halogens such as fluorine, chlorine, and bromine), and further include —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O— (the R moieties each independently represent any substituent, and preferably are a hydrogen atom or an alkyl group having 1-12 carbon atoms, and m is a natural number). Of these, alkylene groups having up to 6 carbon atoms, in particular, methylene, or —CH$_2$OCH$_2$— is preferred from the standpoint of stability during production or use.

Processes for producing the PVA-based resin (B) to be used in the invention are not particularly limited. However, it is preferred to use: (i) a process in which a copolymer of a vinyl ester monomer and a compound represented by the following general formula (2) is saponified; (ii) a process in which a copolymer of a vinyl ester monomer and a compound represented by the following general formula (3) is saponified and decarboxylated; or (iii) a process in which a copolymer of a vinyl ester monomer and a compound represented by the following general formula (4) is saponified and subjected to ketal removal therefrom.

[Chem. 5]

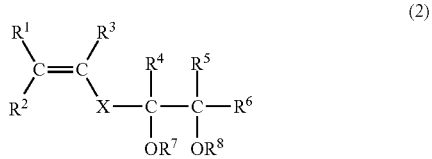

(2)

[Chem. 6]

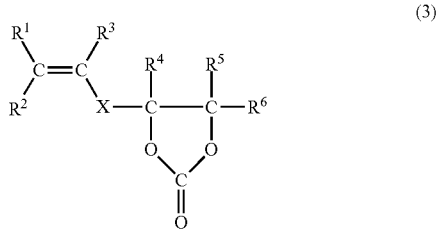

(3)

[Chem. 7]

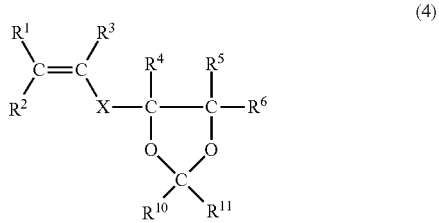

(4)

$R^1$, $R^2$, $R^3$, X, $R^4$, $R^5$, and $R^6$ in the general formulae (2), (3), and (4) have the same meanings as in the general formula (1). $R^7$ and $R^8$ are each independently a hydrogen atom or $R^9$—CO— (wherein $R^9$ is an alkyl group having 1-4 carbon atoms). $R^{10}$ and $R^{11}$ are each independently a hydrogen atom or an alkyl group having 1-4 carbon atoms.

As processes (i), (ii), and (iii), for example, the methods described in JP-A-2006-95825 can be used.

Preferred of these is process (i) in which 3,4-diacyloxy-1-butene, in particular, 3,4-diacetoxy-1-butene, is used as the compound represented by the general formula (2), from the standpoint that this compound is excellent in terms of copolymerizability and industrial handleability.

When vinyl acetate is used as the vinyl ester monomer and this monomer is copolymerized with 3,4-diacetoxy-1-butene, the reactivity ratios (r) of these monomers are: r(vinyl acetate)=0.710 and r(3,4-diacetoxy-1-butene)=0.701. This indicates that 3,4-diacetoxy-1-butene has excellent copolymerizability with vinyl acetate as compared with vinylethylene carbonate, which is an example of the compound represented by the general formula (3) used in process (ii), in which r(vinyl acetate)=0.85 and r(vinylethylene carbonate)=5.4.

Meanwhile, the chin transfer constant (Cx) of 3,4-diacetoxy-1-butene is Cx(3,4-diacetoxy-1-butene)=0.003 (65° C.). This indicates that the compound does not inhibit the degree of polymerization from increasing or is not causative of a decrease in polymerization rate, as compared with vinylethylene carbonate, in which Cx(vinylethylene carbonate)=0.005 (65° C.), and with 2,2-dimethyl-4-vinyl-1,3-dioxolane, which is an example of the compound represented by the general formula (4) used in process (iii) and in which Cx(2,2-dimethyl-4-vinyl-1,3-dioxolane)=0.023 (65° C.).

Furthermore, 3,4-diacetoxy-1-butene, which has such properties, has a great industrial advantage in that the by-product which is yielded when the copolymer of that compound is saponified is the same as the compound that is yielded as a by-product during the saponification from the structural units derived from vinyl acetate, which is frequently employed as the vinyl ester monomer. Namely, there is no need of disposing a special device or performing a special step in the post-treatment or solvent recovery system, and the existing facilities can be utilized.

Incidentally, 3,4-diacetoxy-1-butene, which was mentioned above, can be produced, for example, by the methods of synthesis via an epoxybutene derivative which are described in International Publication WO 2000/24702, U.S. Pat. No. 5,623,086, U.S. Pat. No. 6,072,079, and the like, or by a reaction in which the 1,4-diacetoxy-1-butene obtained as an intermediate product in a 1,4-butanediol production step is isomerized using a metallic catalyst such as palladium chloride.

As a reagent-level product, a product of Acros N.V. is available on the market.

In cases when the PVA-based resin obtained by process (ii) or (iii) has undergone insufficient decarboxylation or deacetalization, carbonate rings or acetal rings remain in the side chains. There are hence cases where this PVA-based resin is crosslinked by such cyclic groups in a heating/drying step during production, resulting in the formation of a gel-form substance, and the like.

Consequently, from this standpoint also, the PVA-based resin obtained by process (i) is suitable for use in the invention.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. However, it is preferred to use vinyl acetate from the standpoint of profitability.

Besides the monomers described above (vinyl ester monomers and compounds represented by the general formulae (2), (3), and (4)), the following compounds may have been copolymerized as comonomer units so long as the comonomer units do not exert a considerable influence on the resin properties: α-olefins such as ethylene and propylene; hydroxy-containing α-olefins such as 3-buten-1-ol, 4-penten-1-ol, and 5-hexene-1,2-diol and derivatives thereof such as acylation products; unsaturated acids such as itaconic acid, maleic acid, and acrylic acid, salts thereof, or mono- or dialkyl esters thereof; and nitriles such as acrylonitrile, amides such as methacrylamide and diacetoneacrylamide, olefinsulfonic acids such as ethylenesulfonic acid, allylsulfonic acid, methallylsulfonic acid, and AMPS or salts thereof, and the like.

The degree of saponification (determined in accordance with JIS K6726) of the PVA-based resin (B) to be used in the invention is usually 70-90% by mole, especially 75-90% by mole, in particular 80-89% by mole, more preferably 85-88% by mole. In case where the degree of saponification thereof is too low, this resin tends to have reduced thermal stability during molding and to have reduced melt tension. Conversely, too high degrees of saponification thereof tend to result in a decrease in water vapor transmission rate (WVTR). Furthermore, such resin tends to have reduced compatibility with the polyamide resin (A), resulting in reduced melt tension and reduced inflation moldability.

It is preferable that the PVA-based resin (B) to be used should be one in which the content therein of structural units represented by the general formula (1) is usually 2-10% by mole, especially 4-8% by mole, in particular 5-7% by mole. In case where the content thereof is too low, this resin tends to have an increased elastic modulus. In addition, this resin tends to have reduced compatibility with the polyamide resin (A), resulting in reduced melt tension and reduced inflation moldability. Conversely, in case where the content thereof is too high, this resin tends to have enhanced reactivity with the polyamide resin (A), resulting in an excessive increase in viscosity and reduced moldability.

The content of structural units represented by the general formula (1) in the PVA-based resin (B) can be determined from a $^1$H-NMR spectrum (solvent, DNSO-d6; internal reference, tetramethylsilane) of a resin obtained by completely saponifying the PVA-based resin (B). Specifically, the content thereof can be calculated from the areas of peaks assigned to the hydroxy protons, methyl protons, and methylene protons contained in the structural units represented by the general formula (1) and to the methylene protons of the main chain, the protons of hydroxy groups bonded to the main chain, and the like.

It is preferable that the PVA-based resin (B) to be used should be one which has an average degree of polymerization (determined in accordance with JIS K6726) of preferably 300-1,100, especially 350-800, in particular 400-600. In case where the average degree of polymerization thereof is too low, this resin tends to have reduced melt tension, making it impossible to stably obtain bubbles when bubbles are to be formed in inflation molding. Conversely, too high average degrees of polymerization thereof tend to result in enhanced heat generation due to shearing and hence in a decrease in stability during molding.

It is desirable that a content ratio (A/B) of the polyamide resin (A) to the PVA-based resin (B) in the resin composition of the invention should be preferably from 90/10 to 51/49, especially from 70/30 to 52/48, in particular from 60/40 to 53/47, in terms of weight ratio. In case where the content ratio of the polyamide resin (A) is too high, the composition tends to have a reduced water vapor transmission rate (WVTR). Conversely, in case where the content ratio of the polyamide resin (A) is too low, there is a tendency that stable bubbles are not obtained when bubbles are to be formed in inflation molding.

The resin composition of the invention may contain an antioxidant for improving thermal stability, a lubricant for improving molding stability, a plasticizer (in particular, one usable as a food additive) for imparting flexibility, and the like, as other components incorporated.

The resin composition of the invention can be subjected as such to melt molding. However, when the efficiency of melt molding and ejection stability are taken into account, it is preferable that the resin composition should be first kneaded in a molten state, subsequently extruded into strands, and solidified by cooling and cut into pellets, and the like.

As a means for conducting this operation, use can be made of a known kneading device such as, for example, an extruder (single-screw or twin-screw), a Banbury mixer, Kneader-ruder, mixing rolls, a blast mill, or the like. Of these, it is preferred to use a twin-screw extruder, which has excellent kneading properties.

The kneading temperature is usually 180-250° C., and is especially preferably 195-210° C. In case where the kneading temperature is too high, the PVA-based resin (B) tends to deteriorate thermally and there also is a tendency that a crosslinking reaction with the polyamide resin (A) proceeds to result not only in an increase in viscosity but also in thermal decomposition due to heat generation by shearing. Conversely, in case where the kneading temperature is too low, the difference in viscosity between the two resins tends to be so large that even mixing is difficult. The kneading period is usually from 10 seconds to 10 minutes, and is especially preferably from 30 seconds to 5 minutes. In case where the kneading period is too long, the PVA-based resin (B) tends to deteriorate thermally and there also is a tendency that a crosslinking reaction with the polyamide resin (A) proceeds to result not only in an increase in viscosity but also in thermal decomposition due to heat generation by shearing. Conversely, in case where the kneading period is too short, it tends to be difficult to evenly mix the two resins.

It is preferred to dispose a vent device, gear pump device, screen device, belt for strand supporting, dry fog generator, and the like according to need. In particular, pellets of the resin composition which have suffered little thermal coloring and little thermal deterioration and have excellent quality can be obtained by forming one or more vent holes in the extruder to conduct vacuum suction in order to remove moisture and by-products (low-molecular-weight pyrolysis products, and the like) or by continuously supplying an inert gas such as nitrogen into the hopper in order to prevent oxygen from coming into the extruder.

The resin composition of the invention is suitable for use in melt molding. Melt-molded articles to be formed from the resin composition of the invention are not particularly limited, and examples thereof include films, sheets, bottles, pipes, tubes, injection-molded objects, and extrudates having various cross-sectional shapes, and further include fibers and nonwoven fabric both produced by a melt spinning method. Mainly employed as melt molding methods for obtaining such melt-molded articles are compression molding, transfer molding, extrusion molding, injection molding, T-die casting, inflation molding, hollow molding, blow molding, calendering, foam molding, vacuum forming, and the like.

The case where the resin composition of the invention is used to form, in particular, a film is explained in detail. Examples of film-forming methods include T-die casting, an inflation method, and the like, and an inflation method is preferred from the standpoint of the high production efficiency thereof. For film formation with stretching, use can be made of a tenter method, single-bubble inflation method, double-bubble inflation method, triple-bubble inflation method, or the like. From the standpoint of suitability for shrink packaging, a double-bubble inflation method is preferred.

The temperature during the film formation is usually 180-250° C., and is especially 200-240° C., more preferably 210-235° C. In case where the temperature is too high, the resins tend to decompose. Conversely, in case where the temperature is too low, there is a tendency that the resin composition is difficult to melt and the extruder stops. The stretch ratio (first bubble) in the transverse direction is usually 1.5-3, especially preferably 2.5-3, while the stretch ratio (second bubble) in the transverse direction is usually 1.02-1.05.

The thickness of the film is usually 5-100 μm, and is especially 10-50 μm, more preferably 15-30 μm. In case where the thickness of the film is too large, there is a tendency that when this film is used for packaging a food such as ham, the moisture is less apt to be released in the drying step. Conversely, in case where the thickness of the film is too small, the melt tension and the film strength tend to be low and stable bubbles tend not to be obtained when bubbles are to be formed in inflation molding.

The water vapor transmission rate (WVTR; $g/m^2 \cdot 24 \, hr \cdot 30 \, \mu m$) of the film is preferably 900-1,500, especially preferably 920-1,000. In case where the water vapor transmission rate thereof is too high, moisture absorption after the production of articles tends to be high. Conversely, in case where the water vapor transmission rate thereof is too low, there is a tendency that the drying requires much time and the contents deteriorate.

The film formed from the resin composition of the invention is suitable for use as food-packaging films for packaging foods, e.g., ham and sausages, moisture-permeable films, humidification films, sustained-release packaging films, and the like.

EXAMPLES

The invention is explained below in more detail by reference to Examples, but the invention should not be construed as being limited to the following Examples unless the invention departs from the spirit thereof. In the following Examples and Comparative Examples, "%" and "parts" are by weight.

[PVA-Based Resin (B1)]

Into a reaction vessel equipped with a reflux condenser and a stirrer were introduced 76.6 parts of vinyl acetate (initial charge ratio, 40%), 14.2 parts of methanol, 9.2 parts of 3,4-diacetoxy-1-butene (initial charge ratio, 40%), and 0.068% by mole azobisisobutyronitrile based on the vinyl acetate introduced. While the contents were being stirred, the temperature was elevated in a nitrogen stream to initiate polymerization, during which the remainder of the vinyl acetate and that of the 3,4-diacetoxy-1-butene were continuously dropped thereinto at constant rates over 13.5 hours. At the time when the conversion of the vinyl acetate into polymer had reached 91%, m-dinitrobenzene was added to terminate the polymerization. Subsequently, the vinyl acetate monomer remaining unreacted was removed from the system by bubbling methanol vapor thereinto, thereby obtaining a methanol solution of a copolymer.

Next, the methanol solution was further diluted with methanol to adjust the concentration to 50% and then introduced into a kneader. While the temperature of the solution was kept at 35° C., a 2% methanol solution of sodium hydroxide was added in such an amount that the sodium hydroxide amount was 4.5 mmol per one mol of the sum of the vinyl acetate structural units and 3,4-diacetoxy-1-butene structural units contained in the copolymer, thereby conducting saponification. As the saponification proceeded, a product of saponification is deposited. At the time when the saponification product had become particles, the particles were taken out by filtration, sufficiently washed with methanol, and dried in a hot-air drying oven. Thus, the desired PVA-based resin (B1) was prepared.

The PVA-based resin (B1) obtained was analyzed for the degree of saponification in terms of the amount of an alkali consumed by hydrolyzing the remaining vinyl acetate and 3,4-diacetoxy-1-butene. As a result, the degree of saponification thereof was found to be 87% by mole. The resin was analyzed for the average degree of polymerization in accordance with JIS K 6726 and, as a result, the average degree of polymerization thereof was found to be 470. Furthermore, the content of structural units represented by the general formula (1) was calculated form integrals determined by $^1$H-NMR (300-MHz proton NMR; d6-DMSO solution; internal reference, tetramethylsilane; 50° C.), and was found to be 6% by mole.

[PVA-Based Resin (B2)]

Into a reaction vessel equipped with a reflux condenser and a stirrer were introduced 76.9 parts of vinyl acetate (initial charge ratio, 40%), 18.5 parts of methanol, 4.6 parts of 3,4-diacetoxy-1-butene (initial charge ratio, 40%), and 0.068% by mole azobisisobutyronitrile based on the vinyl acetate introduced. While the contents were being stirred, the temperature was elevated in a nitrogen stream to initiate polymerization, during which the remainder of the vinyl acetate and that of the 3,4-diacetoxy-1-butene were continuously dropped thereinto at constant rates over 14 hours. At the time when the conversion of the vinyl acetate into polymer had reached 96%, m-dinitrobenzene was added to terminate the polymerization. Subsequently, the vinyl acetate monomer remaining unreacted was removed from the system by bubbling methanol vapor thereinto, thereby obtaining a methanol solution of a copolymer.

Next, the methanol solution was further diluted with methanol to adjust the concentration to 50% and then introduced into a kneader. While the temperature of the solution was kept at 35° C., a 2% methanol solution of sodium hydroxide was added in such an amount that the sodium hydroxide amount was 3.5 mmol per one mol of the sum of the vinyl acetate structural units and 3,4-diacetoxy-1-butene structural units contained in the copolymer, thereby conducting saponification. As the saponification proceeded, a product of saponification is deposited. At the time when the saponification product had become particles, the particles were taken out by filtration, sufficiently washed with methanol, and dried in a hot-air drying oven. Thus, the desired PVA-based resin (B2) was prepared.

The PVA-based resin (B2) obtained had a degree of saponification of 87% by mole and an average degree of polymerization of 470, and the content therein of structural units represented by the general formula (1) was 3% by mole.

[PVA-Based Resin (B3)]

The same procedure as in the production of PVA-based resin (B1) was conducted, except that the saponification reaction was performed for further 20 minutes from the time when the saponification product which had been deposited in the saponification had become particles, and that the precipitate was then taken out by filtration. Thus, PVA-based resin (B3) was prepared.

The PVA-based resin (B3) obtained had a degree of saponification of 93% by mole and an average degree of polymerization of 470, and the content therein of structural units represented by the general formula (1) was 6% by mole.

[PVA-Based Resin (B4)]

The same procedure as in the production of PVA-based resin (B2) was conducted, except that the saponification reaction was performed for further 20 minutes from the time when the saponification product which had been deposited in the saponification had become particles, and that the precipitate was then taken out by filtration. Thus, PVA-based resin (B4) was prepared.

The PVA-based resin (B4) obtained had a degree of saponification of 93% by mole and an average degree of polymerization of 470, and the content therein of structural units represented by the general formula (1) was 3% by mole.

[PVA-Based Resin (B5)]

The same procedure as in the production of PVA-based resin (B1) was conducted, except that the amount of the saponification reaction catalyst (sodium hydroxide) was changed to 12 mmol per one mol of the sum of the vinyl acetate structural units and the 3,4-diacetoxy-1-butene structural units. Thus, PVA-based resin (B5) was prepared.

The PVA-based resin (B5) obtained had a degree of saponification of 99% by mole and an average degree of polymerization of 470, and the content therein of structural units represented by the general formula (1) was 6% by mole.

[PVA-Based Resin (B6)]

The same procedure as in the production of PVA-based resin (B1) was conducted, except that the saponification reaction was performed for further 12 minutes from the time when the saponification product which had been deposited in the saponification had become particles, and that the precipitate was then taken out by filtration. Thus, PVA-based resin (B6) was prepared.

The PVA-based resin (B6) obtained had a degree of saponification of 84% by mole and an average degree of polymerization of 470, and the content therein of structural units represented by the general formula (1) was 6% by mole.

Example 1

Production of Film

To PVA-based resin (B1) were added magnesium stearate ("EM-101B", manufactured by Katsuda Kako K.K.) and magnesium 12-hydroxystearate ("EM-612, manufactured by Katsuda Kako K.K.) as lubricants each in an amount of 0.05% based on the PVA-based resin (B1). This mixture was melt-kneaded with a twin-screw extruder at a set temperature of 190° C. and pelletized.

The pellets of PVA-based resin (B1) obtained were dry-blended with nylon-6/66 ("NOVAMID 2420J", manufactured by DSM Japan; melting point, 187° C.; viscosity, 1,368 Pa·s (shear rate, 120 sec$^{-1}$; 220° C.)) as a polyamide resin (A) so as to result in a blending ratio (A/B1) of 55/45 (by weight). This blend was formed into a film using a twin-screw film-forming machine at temperatures of 150-190° C. Thus, a film having a thickness of 30 μm was obtained.

(Film Formation Conditions)

Temperature pattern: C1/C2/C3/C4/C5/C6/C7/C8/D=150/170/180/185/190/190/190/190/190 (° C.)

Screen mesh: 90/90 mesh

Screw pattern: full-flighted

Film formation die: hanger coat die (width, 30 cm)

[Water Vapor Transmission Rate (Cup Method)]

In accordance with JIS Z 0208, the opening of a cup which contained a moisture absorbent was tightly covered with the obtained film, and this cup was allowed to stand still in a thermo-hygrostatic chamber of 40° C. and 90% RH for 24 hours. The water vapor transmission rate per unit area was calculated from the weight change of the moisture absorbent.

[Elastic Modulus]

The obtained film (thickness, 30 μm) was cut into 150 mm×10 mm, and the cut film was subjected to a tensile test using Autograph ("AG-IS", manufactured by Shimadzu Corp.) under the following conditions to determine the elastic modulus thereof.

Chuck-to-chuck distance: 30 mm

Pulling speed: 100 mm/min

Measuring environment: 20° C., 50% RH

[Inflation Moldability]

The pellets of PVA-based resin (B1) were dry-blended with nylon-6/66 ("NOVAMID 2420J", manufactured by DSM Japan; melting point, 187° C.; viscosity, 1,368 Pa·s (shear rate, 120 sec$^{-1}$; 220° C.)) as a polyamide resin (A) so as to result in a blending ratio (A/B1) of 55/45 (by weight). This blend was used as a feed material to form a film using an inflation film forming machine ("L40A", manufactured by Placo Co. Ltd.) under the following conditions. The moldability thereof was evaluated in accordance with the following criteria.

(Molding Conditions)

Screw: 40 mm, L/D=28/1 full-flighted plus Dulmage head

Screen: 60 mesh

Shape of die lips: inner diameter, 42 mm; outer diameter, 50 mm (clearance, 4 mm)

Molding temperature: 210° C.

Stretch ratio: 5-7

(Evaluation Criteria)

A: Stable film formation was possible

B: Film formation was possible

C: Slight fluctuations in film thickness

D: Bubble was unstable and film formation was impossible

Examples 2 and 3 and Comparative Examples 1 to 3

Films were prepared in the same manner as in Example 1, except that the PVA-based resin (B1) used in Example 1 was replaced with each of PVA-based resins (B2) to (B6) (see Table 1). Furthermore, these films were evaluated for water vapor transmission rate (cup method), elastic modulus, and inflation moldability. The results of the evaluation are summarized in Table 2.

TABLE 1

| | | PVA-based resin (B) | | |
|---|---|---|---|---|
| | Polyamide resin (A) | Amount of modification (mol %) | Degree of saponification (mol %) | Degree of polymerization |
| Example 1 | nylon-6/66 | B1 | 6 | 87 | 470 |
| Example 2 | nylon-6/66 | B2 | 3 | 87 | 470 |
| Example 3 | nylon-6/66 | B6 | 6 | 84 | 470 |
| Comparative Example 1 | nylon-6/66 | B3 | 6 | 93 | 470 |
| Comparative Example 2 | nylon-6/66 | B4 | 3 | 93 | 470 |
| Comparative Example 3 | nylon-6/66 | B5 | 6 | 99 | 470 |

TABLE 2

| | WVTR (g/m$^2$ · 24 hr · 30 μm) | Elastic modulus (N/mm$^2$) | Inflation moldability |
|---|---|---|---|
| Example 1 | 980 | 636 | A |
| Example 2 | 960 | 869 | B |
| Example 3 | 985 | 620 | A |

TABLE 2-continued

| | WVTR (g/m² · 24 hr · 30 μm) | Elastic modulus (N/mm²) | Inflation moldability |
|---|---|---|---|
| Comparative Example 1 | 920 | 1207 | C |
| Comparative Example 2 | 850 | 1482 | D |
| Comparative Example 3 | 650 | 1536 | D |

As shown in Table 2, the films of Examples 1 to 3, which each had been formed from a resin composition comprising a polyamide resin (A) and a PVA-based resin (B) including 2-10% by mole of structural units represented by the general formula (1) and having a degree of saponification of 70-90% by mole, each gave satisfactory evaluation results with respect to water vapor transmission rate, elastic modulus, and inflation moldability.

Meanwhile, the films formed from the resin compositions of Comparative Examples 1 to 3 showed a low water vapor transmission rate, a high elastic modulus, and poor inflation moldability because the PVA-based resins (B3) to (B5) each had too high a degree of saponification.

Consequently, the films of Examples 1 to 3 are suitable for use in packaging water-containing foods, whereas the films of Comparative Examples 1 to 3 are unsuitable for use as such packaging films.

While the invention has been described in detail and with reference to specific embodiments thereof, it will be apparent to one skilled in the art that various changes and modifications can be made therein without departing from the spirit and scope thereof. The present application is based on Japanese Patent Application No. 2012-273530 filed on Dec. 14, 2012, and the contents are incorporated herein by reference.

The invention claimed is:

1. A resin composition comprising
a polyamide resin (A) and
a polyvinyl alcohol-based resin (B), which includes 2-10% by mole of a structural unit represented by formula (1) and has a degree of saponification of 70-89% by mole

[Chem. 1]

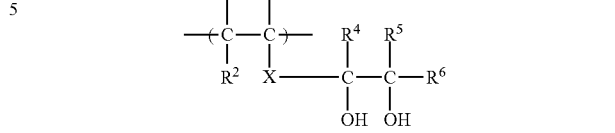

(1)

wherein $R^1$, $R^2$, and $R^3$ each independently represents a hydrogen atom or an alkyl group having 1-4 carbon atoms, X represents a single bond, and $R^4$, $R^5$, and $R^6$ each independently represents a hydrogen atom or an organic group; and
wherein the weight ratio (A/B) of the polyamide resin (A) to the polyvinyl alcohol-based resin (B) is from 90/10 to 51/49.

2. The resin composition according to claim 1, wherein the content of the structural unit represented by formula (1) in the polyvinyl alcohol-based resin (B) is 4-8% by mole.

3. The resin composition according to claim 1, wherein the structural unit represented by formula (1) is the structural unit represented by formula (1')

[Chem. 2]

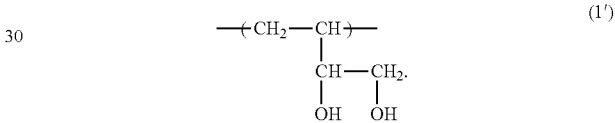

(1')

4. The resin composition according to claim 1, wherein the polyamide resin (A) has a melting point of 150-240° C.

5. The resin composition according to claim 1, which gives a film that has a water vapor transmission rate of 900-1,500 g/m²·24 hr·30 μm.

6. A film which is formed from the resin composition according to claim 1.

* * * * *